United States Patent [19]

Tuerk et al.

[11] Patent Number: 4,902,064

[45] Date of Patent: Feb. 20, 1990

[54] TARP COVER SYSTEM INCLUDING BUMP-RAIL AND COVER TENSIONING MEANS

[75] Inventors: James R. Tuerk; Robert P. Tuerk, both of Indianapolis, Ind.

[73] Assignee: Aero Industries, Inc., Indianapolis, Ind.

[21] Appl. No.: 287,071

[22] Filed: Dec. 21, 1988

[51] Int. Cl.$^4$ ............................................. B62D 25/06
[52] U.S. Cl. ..................................... 296/105; 296/105
[58] Field of Search ............................... 296/105, 1001

[56] References Cited

U.S. PATENT DOCUMENTS

| | | | |
|---|---|---|---|
| 3,310,338 | 3/1967 | Greenberg | 296/100 |
| 3,326,598 | 6/1967 | Kunsch | 296/105 |
| 3,433,470 | 3/1969 | Erke | 296/183 |
| 4,289,346 | 9/1981 | Bourgeois | 296/105 |
| 4,711,484 | 12/1987 | Tuerk | 296/105 |

*Primary Examiner*—Robert R. Song

*Attorney, Agent, or Firm*—Laubscher, Presta & Laubscher

[57] ABSTRACT

A tarp cover system for flat bed vehicles includes inverted U-shaped bow members that extend transversely of the vehicle, the lower ends of the leg portions of the bow members being connected with carrier devices by means of which the bow members are displaced longitudinally of the vehicle. The bow members carry a tarp cover member that covers and uncovers the vehicle bed when the bow members are displaced longitudinally between expanded and contracted conditions relative to the vehicle. Bump rails are provided that protrude at each side of the flat bed beyond the guide tracks in which the bow carrier devices are displaced, thereby to protect the guide tracks and carriers against damage, and also to permit connection of the load to the flat bed regardless of whether the cover is in the expanded load-covering condition, or the contracted load-exposing condition. The guide tracks are so designed that when the cover is in the load-covering condition, the rearmost bow member is slightly inclined rearwardly, thereby to tension at least the rear portion of the cover.

7 Claims, 3 Drawing Sheets

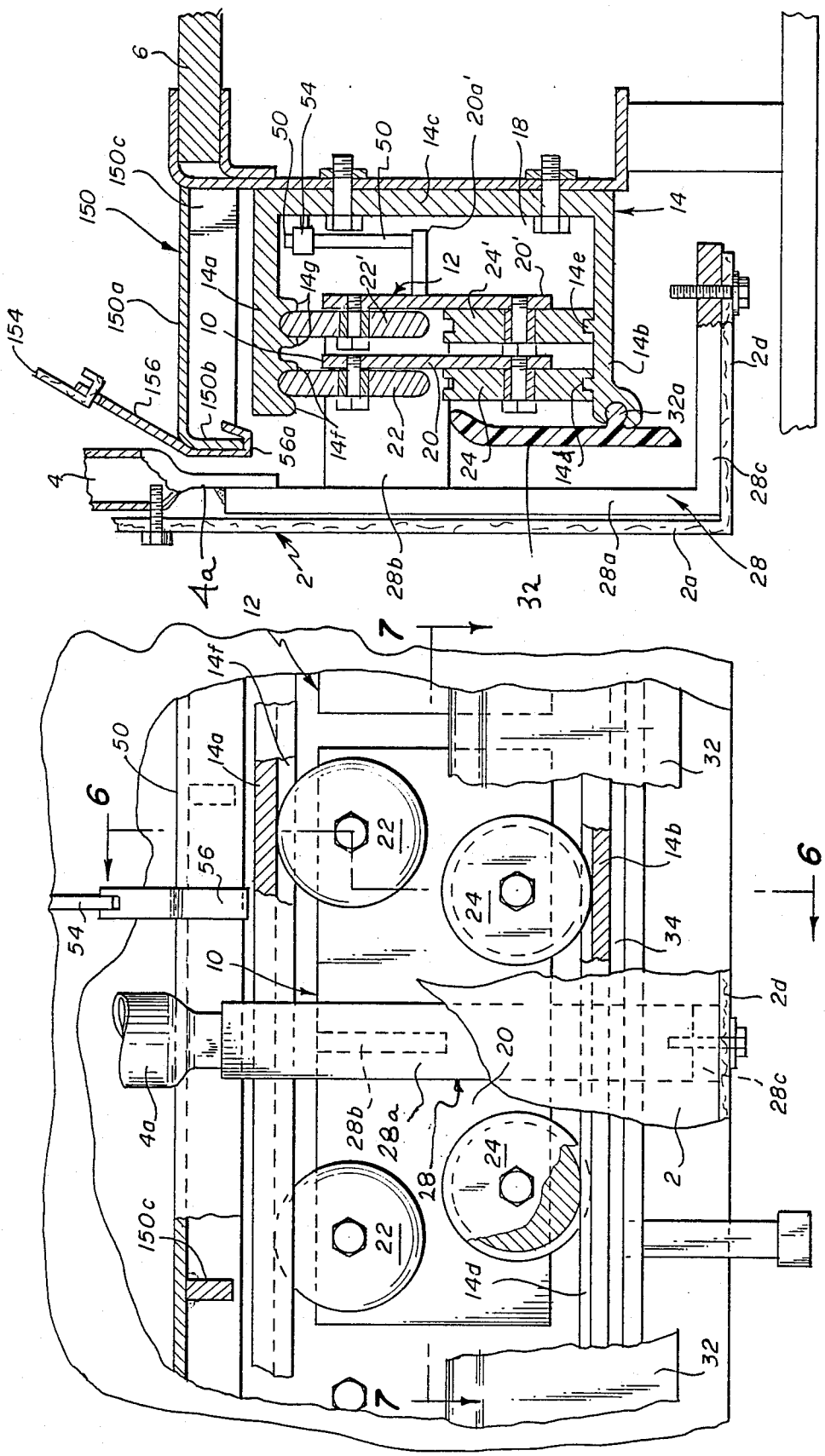

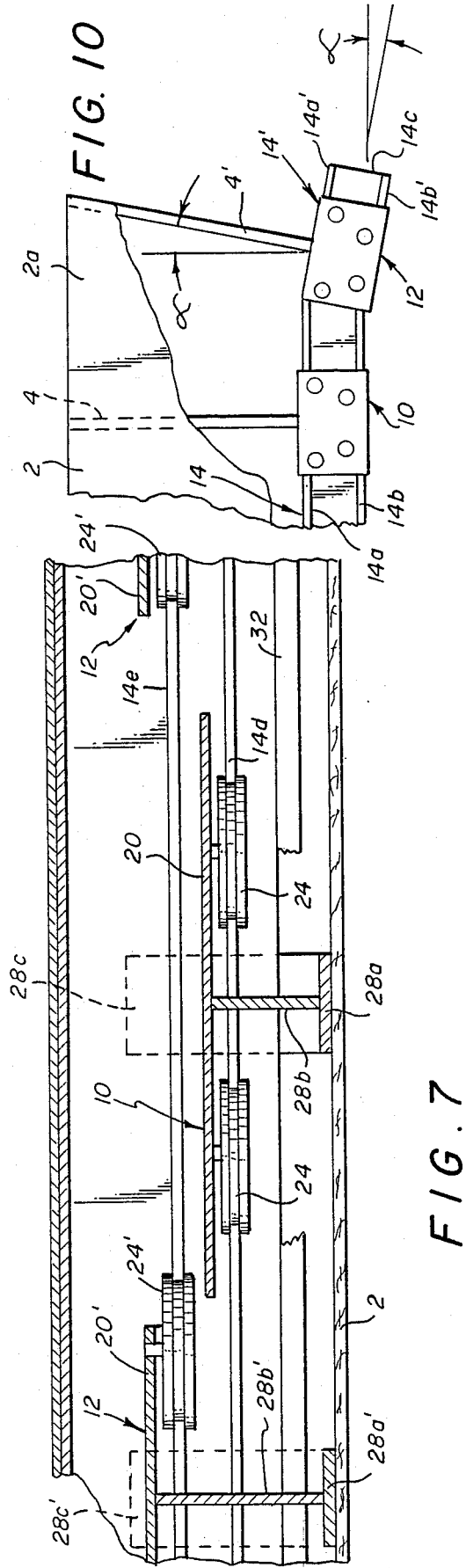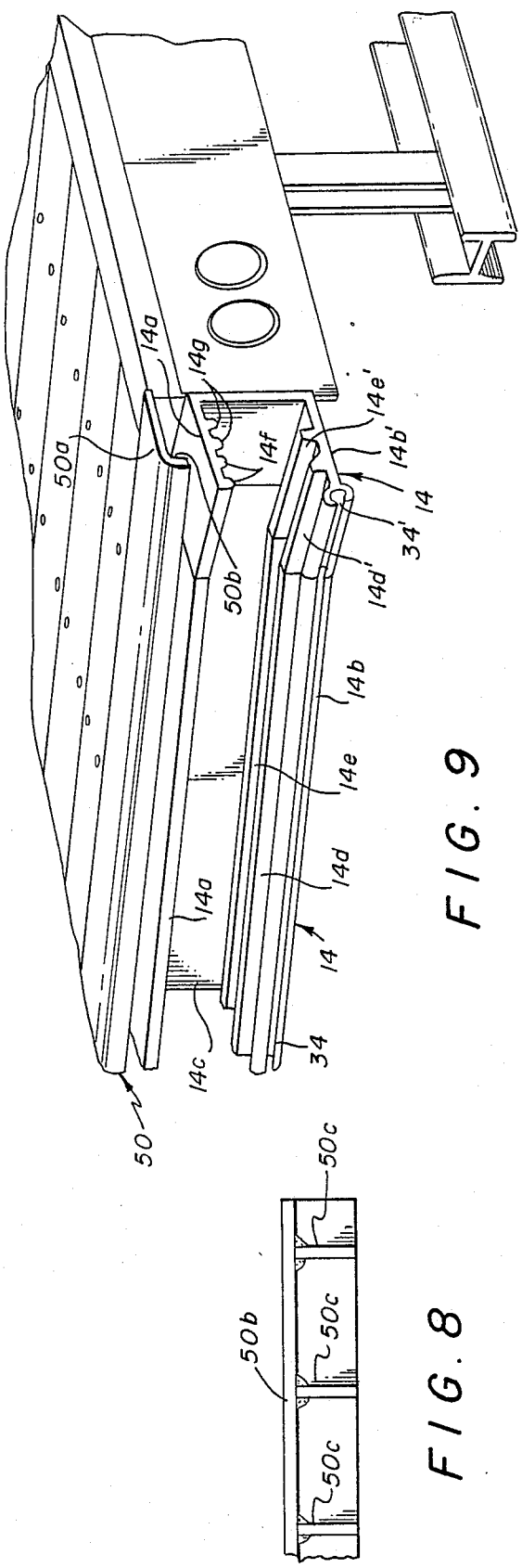

TARP COVER SYSTEM INCLUDING BUMP-RAIL AND COVER TENSIONING MEANS

BRIEF DESCRIPTION OF THE PRIOR ART

This invention relates to an improved tarp cover system for flat bed vehicles, use being made of inverted U-shaped bow members that are longitudinally displaceable between extended and collapsed conditions to operate a tarp cover member between covered and uncovered conditions, respectively, relative to the space above the flat bed.

This invention is an improvement over the Conestoga-type tarp cover system disclosed in the U.S. Pat. No. 4,711,484 that issued on Dec. 8, 1987, to James R. Tuerk, a co-inventor of the instant improvement invention.

Such tarp systems are generally well known in the patented prior art, as evidenced, for example, by the prior patents to Kunsch U.S. Pat. No. 3,326,598, Bourgeois U.S. Pat. No. 4,289,346, Greenberg U.S. Pat. No. 3,310,338, and Erke U.S. Pat. No. 3,433,470, among others. In Kunsch, the bows are supported for displacement by rollers that ride on the lower rail of a rail pair, the struts being connected by hinged braces which in the extended position of the cover are in a substantially straight line so that the struts are held rigidly apart with respect to each other. Complex means are provided for effecting folding of the braces to permit the bows to be drawn closely adjacent one another in the folded position, whereby the cover is retracted substantially completely from over the truck bed. In Bourgeois, Greenberg and Erke, the bows are similarly supported by rollers that run in tracks.

One problem of the known tarp system is that of protecting or sealing the roller support devices and their associated guide tracks from the deleterious effects of the weather, and from road debris and foreign objects that otherwise would hinder and/or obstruct the operation of the device. Another problem is that of effecting compactness of the bow members when in the collapsed condition, whereby the maximum space above the flat bed will be exposed for the mounting and removal of objects to be transported thereon. Another problem is that of providing suitable tensioning of the tarp cover when in the bow-extended condition, thereby to prevent undesirable flapping and billowing of the tarp which reduce the operating life thereof. A further problem resides in protecting the cover operating means against impact by cargo loading equipment, other vehicles, and stationary objects during the backing up and parking of the flat bed truck or semi-trailer.

SUMMARY OF THE INVENTION

Accordingly, an object of the invention is to provide bump rail means for protecting the cover operating means against damage by loading equipment, other vehicles, and other objects during transport and parking of the vehicle, and for securing the load to the flat bed.

According to a more specific object of the invention, the bump rail means includes a rigid metal protective member that is attached to each side rail of the trailer above the track and which protrudes outwardly therefrom at a distance that is greater than the track. The purpose of the bump-rail is threefold: (1) to add width to the trailer so that the load bearing area will increase approximately 5", (2) to provide a sturdy base for cargo strap or chain tie downs to secure the load, and (3) to provide protection from side loading equipment (such as forklifts) from damaging the track. Traditionally tie down facilities on trailers include either the pocket and rub-rails, or some sort of ring device built into the deck. Since the pocket and rub-rail portion are no longer part of the trailer with the Conestoga-type system and/or the loads sometimes cover the deck, an alternative tie-down system is needed. The resulting needs are answered by the bump-rail.

Another object of the invention is to provide a Conestoga-type tarp cover system having guide tracks so designed as to position one or more of the rear bows in such a manner as to tension at least the rear portion of the cover when in the load covering condition. To this end, the rear portion of each guide track arrangement associated with the cover carrier device is inclined downwardly, whereby as the roller mechanism of the rearmost bow carrier device enters this part of the track, the bow which is attached to this roller "leans" back and away from the front of the trailer, thereby pulling the tarp taught. This has two effects: (1) tension is placed on the tarp to prevent windwhip, and (2) this eliminates the need for means for securing the bow externally. By eliminating the need for an external securing device, which would likely be a rear "post", the possibility of obstruction during loading or unloading of the trailer is avoided. Also the driver will not have to take the time to physically secure the bow. The bow mechanism, and therefore the Conestoga cover system automatically secures itself.

Accordingly to a further object of the invention, a clip and load strap arrangement is provided for cooperating with the longitudinally extending bump rails to secure the load to the flat bed truck or trailer, regardless of whether the cover is in the covered or uncovered condition.

BRIEF DESCRIPTION OF THE DRAWINGS

Other objects and advantages of the invention will become apparent from a study of the following specification when viewed in the light of the accompanying drawings, in which:

FIG. 5 is a front elevational view of the improved bow carrier and bump rail construction of the present invention;

FIGS. 6 and 7 are sectional views taken along lines 6—6 and 7—7, respectively, of FIG. 5;

FIG. 8 is a bottom view of the bump rail of FIGS. 5-7; and

FIGS. 9 and 10 are detailed perspective and schematic views, respectively, illustrating the inclined rear end portion of the longitudinal carriage guide tracks for tensioning the rear end portion of the tarp cover member.

DETAILED DESCRIPTION

Figure 1:
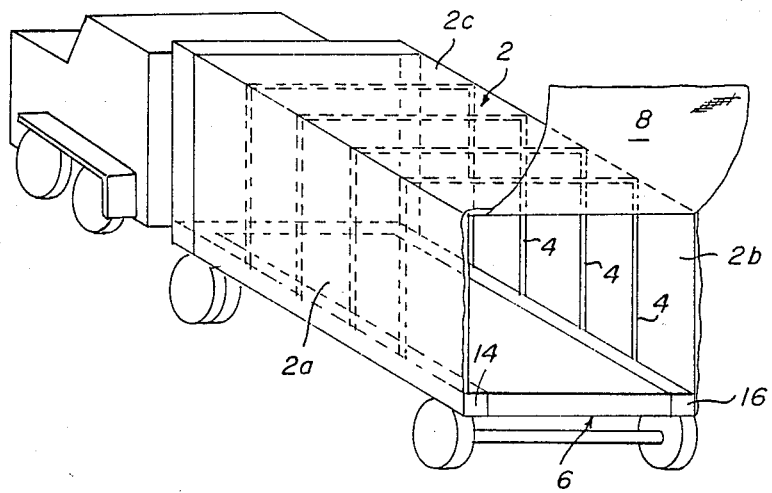
FIG. 1 is a rear perspective view of the tarp cover system of the present invention as used in connection with a flat bed vehicle, the bows of the system being shown in the expanded flat bed covering condition.
Figure 2:
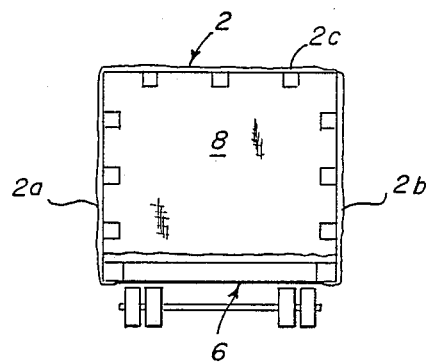
FIG. 2 is a rear end view of the vehicle with the rear tarp curtain in the closed condition.
Figure 3:
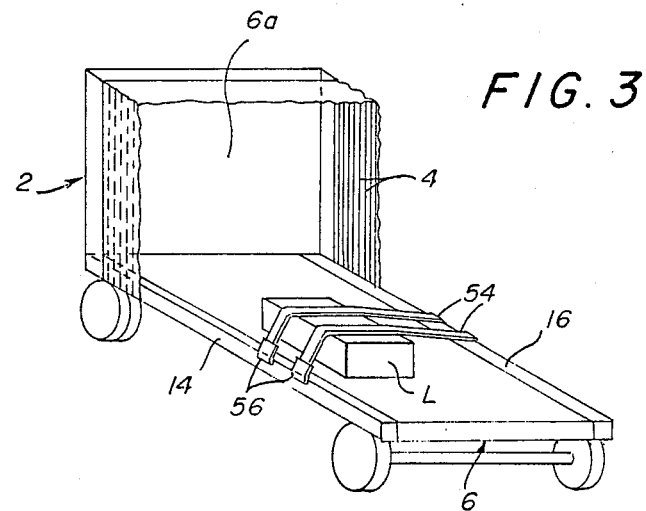
FIG. 3 is a rear end view of the vehicle with the tarp system in the collapsed flat bed uncovering condition.

Referring first more particularly to FIGS. 1-3, the tarp cover system of the present invention includes a sheet-like waterproof flexible tarp member 2 that is supported by inverted U-shaped bow members 4 for covering an enclosed space above a flat bed trailer or other vehicle 6. A rear curtain 8 is provided that may be tied down to close the rear end of the space enclosed above the vehicle bed, as shown in FIG. 2. The bow members 4 are displaceable longitudinally of the trailer bed 6 between the expanded condition of FIG. 1 and the collapsed condition of FIG. 3. To this end, the lower ends of the leg portions 4a of successive bow members 4 are connected with corresponding pairs of outer and inner carrier means 10 and 12, respectively, that are longitudinally displaceable within longitudinal guide tracks 14 and 16, respectively, that are secured with opposite sides of the flat bed member 6, as shown in FIGS. 1 and 3.

Referring now to FIG. 6, it will be seen that the guide track 14 has a generally C-shaped configuration including upper and lower flange portions 14a and 14b that are connected by a vertical center portion 14c, thereby defining a longitudinally extending lateral opening 18. The guide track includes outer and inner lower guide rails 14d and 14e, and outer and inner pairs of superposed upper guide rails 14f and 14g, respectively, that extend longitudinally of the vehicle bed 6. The outer carrier means 10 includes a vertically arranged, longitudinally extending outer carrier plate 20 to which are rotatably connected pairs of upper and lower wheels 22 and 24, respectively, that are arranged for rotation about horizontal transverse axes. The lower rollers contain in their outer peripheries circumferential grooves that receive the lower outer guide rails 14d, and the upper rollers 22 have curved profiles for reception between the associated pair of upper guide rails 14f. The carrier plate 20 is connected with the associated bow member 4 by an L-shaped support member 28 having a vertical leg portion 28a secured to the carrier plate by a horizontal extension 28b, and a horizontal lower tongue portion 28c that extends in spaced relation beneath the guide rail 14. At its upper end, the carrier support member 28 is welded to the lower end of the associated leg portion of the U-shaped bow member 4. The side portion 2a of the tarp member 2 extends downwardly adjacent the outer surfaces of the bow members 4 and the associated carrier means and terminates at its lower end by a bottom flap portion 2d that is secured to the bottom of the tongue portion 28c by suitable means (for example, by bolts or rivets 30). A resilient generally-rectangular sheet-like synthetic plastic seal member 32 is provided for covering the opening 18 contained in the guide track 14, the lower edge of the seal member being provided with a lateral rib portion 32a of a configuration corresponding with a groove 34 formed in the lower flange portion 14b of the guide track 14. The next successive carrier means 12 is an inner carrier arrangement mounted for longitudinal displacement on the lower guide rail 14e, the upper rollers 22' extending between the pair of upper guide rails 14g. This arrangement permits overlapping of the adjacent ends of the carrier means when in the cover-collapsed condition of FIG. 3. Thus, the bow members are closely adjacent each other when in the collapsed condition, and the maximum space of the flat bed is exposed.

As shown in FIG. 7, the length of the connecting portion 28b' of the inner bow carrier means 12 is greater than that of the connecting portion 28b of the outer bow carrier means 10. Otherwise, the construction of the bow carrier means and the L-shaped bow supports are identical.

Figure 4:
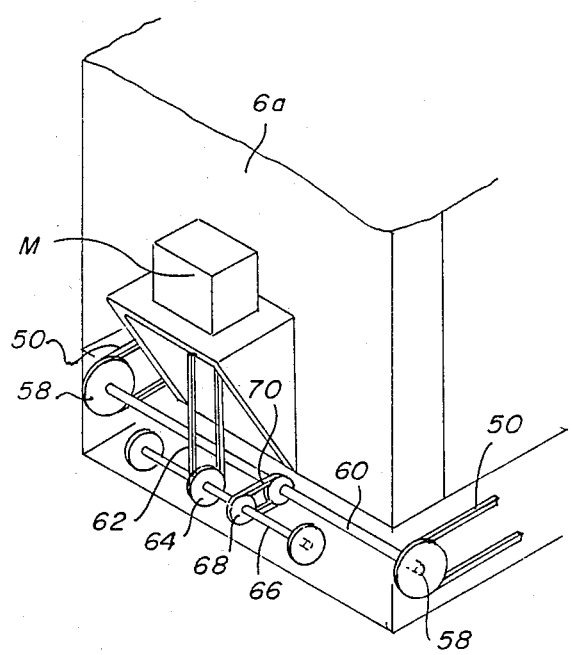
FIG. 4 is a schematic perspective view illustrating the drive means for the bow carrier devices.

In order to displace the bow members between their expanded and collapsed positions illustrated in FIGS. 1 and 3, respectively, the rearwardmost inner carrier means 12 are each longitudinally driven via a pair of endless sprocket chains 50 (FIGS. 4 and 6) arranged within the guide tracks 14 and 16, respectively. The lower runs of the endless guide chains 50 are connected with a rear extension 20a' (FIG. 6) of the plate member 20' of carrier means 12, the upper runs of the chains being supported by idler sprockets, as shown in the aforementioned Tuerk U.S. Pat. No. 4,711,484. At its forward end, each of the sprocket chains 50 is mounted on a drive sprocket 58 (FIG. 6) that is secured to the associated end of transverse shaft 60 that is driven from motor M via drive chain 62, sprocket gear 64, intermediate shaft 66, sprocket gear 68, and intermediate sprocket chain 70. The motor end drive chain means are mounted on the fixed forward vertical wall 6a of the flat bed vehicle 6. Of course, if desired, the drive chains 50 could be driven manually by suitable hand crank means, not shown.

In accordance with a characterizing feature of the invention, there is provided in overlying spaced relation above each guide track a bump rail 150 including a horizontal portion 150a welded at one longitudinal edge with the chassis of the flat bed vehicle, the other longitudinal edge terminating in a downwardly extending protective flap portion 150b. Horizontal transversely-arranged strengthening ribs 150c (FIGS. 5, 6 and 8) are welded to the lower surface of each bump rail and extend normal to the longitudinal axis thereof. The bump rails extend laterally from the chassis in protective relation beyond the guide tracks 14 and 16, respectively. According to another important feature, means are provided for fastening loads to the flat bed, said fastening means including flexible adjustable length load strap means 154 woven from strong synthetic plastic filaments, and a metal clip member 156 that terminates at its lower end in a hook portion 156a that extends in locking engagement beneath the lip portion 150b of the bump rail 150. At its other end, the load strap is similarly connected by a like clip member with the other bump rail which extends outwardly from the associated guide track 16, as shown generally in FIGS. 3 and 6.

Referring now to FIGS. 9 and 10' in accordance with another important feature of the present invention, the bow carrier guide tracks 14 and 16 are formed in such a manner as to produce tensioning of the cover when in the covered condition of FIG. 1. More particularly, the rear extremity of each guide track is inclined downwardly by the angle $\alpha$, so that when the rearmost carrier means 12 has been displaced rearwardly to the position of FIG. 10, it also is displaced through the angle $\alpha$ relative to the horizontal, so that the associated bow 4' is inclined rearwardly relative to the vertical through the angle $\alpha$, thereby to automatically tension the rear portion 2a of the tarp cover 2 secured thereto.

OPERATION

In operation, assuming that the flat bed vehicle is in the fully covered condition of FIG. 1, the rear curtain 8 is lowered and tied down to the closed condition of FIG. 2, whereupon owing to the connection of the tarp bottom flaps 2d with the bottom tongue portions 28c (FIG. 6), and to the provision of the angular rearward displacement of the rearmost bow 4' through the angle α, as produced by the downwardly inclined rearmost portions of the guide tracks 14 and 16, the tarp cover member is properly tensioned for transport in such a manner that buckling or flapping of the tarp is avoided. The guide tracks are sealed against road debris both by the cover bottom flap and side wall portions, and by the seal members 32. The load L is rigidly fastened with the flat bed vehicle by the adjustable-length load strap means 54 and the metal fastening clips 56.

To uncover the flat bed vehicle, the rear curtain member 8 is untied, and the motor drive means M is actuated to transport the rearwardmost carrier means 12 of each guide track forwardly of the vehicle. As shown in FIG. 7, the horizontal portion 28b of the support member of the rearwardmost carrier means 12 engages the rear vertical edge of the carrier plate 20 of the next successive carrier means 10, thereby to cause this carrier means, and the portion of the tarp fastened thereto, to move forwardly of the flat bed. When the forward edge of carrier plate 20 engages the horizontal portion 28b' of the support means of the next successive carrier means 12, this carrier means, and the tarp portion fastened thereto, are also moved forwardly to displace the bows toward their collapsed condition. Owing to the mounting of successive carrier means on the associated inner and outer guide rails, respectively, the adjacent ends of the carrier members overlap, with the advantageous result that the bows are in tightly compacted relation when in the completely collapsed condition, thereby fully uncovering the space above the vehicle flat bed.

To recover the flat bed of the vehicle, the motor M is driven in the opposite direction to rearwardly displace the rearwardmost carrier means of each guide track, and owing to their connections with the tarp cover, the remaining carrier means are displaced rearwardly to correspondingly displaced bows rearwardly toward their tarp-covered condition of FIG. 1.

What is claimed is:

1. A tarp system for covering a load arranged on a flat bed vehicle, comprising:
   (a) a pair of longitudinal guide tracks adapted for mounting adjacent the opposite sides of the vehicle flat bed;
   (b) a plurality of longitudinally arranged inverted U-shaped bow members each having a first generally horizontal portion extending transversely in spaced relation above the vehicle flat bed, and a pair of downwardly depending vertical leg portions the lower ends of which terminate adjacent said guide tracks, respectively;
   (c) a plurality of carrier means connecting the lower ends of said bow leg portions for sliding movement relative to the associated guide track, respectively, said bow members normally having an expanded condition relative to each other in which said bow members are spaced longitudinally of the flat bed vehicle;
   (d) a sheet-like flexible tarp cover member supported by said bow members to enclose at least a portion of the space above the flat bed vehicle when said bow members are in said expanded condition, said tarp member having a top portion supported by said bow horizontal positions, and a pair of side portions extending downwardly adjacent the external surfaces of said bow leg portions, respectively;
   (e) means for relatively displacing said bow members between said expanded condition and a collapsed condition in which said bow members are adjacent each other and said tarp member is collapsed to uncover said flat bed portion;
   (f) bump rail means extending laterally from each side of said flat bed parallel with, spaced upwardly from and horizontally outwardly beyond said guide tracks, respectively, thereby to protect said guide tracks and said bow carrier means; and
   (g) load fastening means extending transversely of said flat bed between said bump rails for fastening a load to said flat bed.

2. Apparatus as defined in claim 1, wherein each bump rail includes at its longitudinal edge remote from said flat bed a downwardly extending lip portion, and further wherein said load fastening means includes a pair of clip members removably connected with said bump rails, respectively, and load strap means extending between said clip members.

3. A tarp system for covering a load arranged on a flat bed vehicle, comprising:
   (a) a pair of longitudinal guide tracks adapted for mounting adjacent the opposite sides of the vehicle flat bed;
   (b) a plurality of longitudinally arranged inverted U-shaped bow members each having a first generally horizontal portion extending transversely in spaced relation above the vehicle flat bed, and a pair of downwardly depending vertical leg portions the lower ends of which terminate adjacent said guide tracks respectively;
   (c) a plurality of carrier means connecting the lower ends of said bow leg portions for sliding movement relative to the associated guide track, respectively, said bow members normally having an expanded condition relative to each other in which said bow members are spaced longitudinally of the flat bed vehicle;
   (d) a sheet-like flexible tarp cover member supported by said bow members to enclose at least a portion of the space above the flat bed vehicle when said bow members are in said expanded condition, said tarp member having a top portion supported by said bow horizontal positions, and a pair of side portions extending downwardly adjacent the external surfaces of said bow leg portions, respectively;
   (e) means for relatively displacing said bow members between said expanded condition and a collapsed condition in which said bow members are adjacent each other and said tarp member is collapsed to uncover said flat bed portion; and
   (f) bump rail means extending laterally from each side of said flat bed parallel with, spaced upwardly from and horizontally outwardly beyond said guide tracks, respectively, thereby to protect said guide tracks and said bow carrier means;
   (g) each of said guide tracks including means effecting rearward angular inclination of the rearmost bow member when said cover is in the expanded vehicle-covered condition, thereby to tension at least the rearmost portion of said cover member.

4. Apparatus as defined in claim 3, wherein said means effecting said rearward bow inclination comprises downwardly inclined rear terminal portions of said guide tracks, respectively.

5. A tarp system for covering a load arranged on a flat bed vehicle, comprising:
   (a) a pair of longitudinal guide tracks adapted for mounting adjacent the opposite sides of the vehicle flat bed;
   (b) a plurality of longitudinally arranged inverted U-shaped bow members each having a first generally horizontal portion extending transversely in spaced relation above the vehicle flat bed, and a pair of downwardly depending vertical leg portions the lower ends of which terminate adjacent said guide tracks, respectively;
   (c) a plurality of carrier means connecting the lower ends of said bow leg portions for sliding movement relative to the associated guide track, respectively, said bow members normally having an expanded condition relative to each other in which said bow members are spaced longitudinally of the flat bed vehicle;
   (d) a sheet-like flexible tarp cover member supported by said bow members to enclose at least a portion of the space above the flat bed vehicle when said bow members are in said expanded condition, said tarp member having a top portion supported by said bow horizontal portions, and a pair of side portions extending downwardly adjacent the external surfaces of said bow leg portions, respectively;
   (e) means for relatively displacing said bow members between said expanded condition and a collapsed condition in which said bow members are adjacent each other and said tarp member is collapsed to uncover said flat bed portion; and
   (f) means associated with said guide tracks for effecting rearward angular inclination of the rearmost bow member when said cover is in the expanded condition, thereby to tension at least the rearmost portion of said cover member.

6. Apparatus as defined in claim 5, wherein said means effecting said rearward bow inclination includes downwardly inclined rear terminal portions of said guide tracks, respectively.

7. A tarp system for covering a load arranged on a flat bed vehicle, comprising:
   (a) a pair of longitudinal guide tracks adapted for mounting adjacent the opposite sides of the vehicle flat bed, each of said guide tracks containing on its outer side surface a longitudinally extending opening, said guide tracks further including opposed pairs of parallel laterally-spaced longitudinally-extending inner and outer guide rails mounted in said opening;
   (b) a plurality of longitudinally arranged inverted U-shaped bow members each having a first generally horizontal portion extending transversely in spaced relation above the vehicle flat bed, and a pair of downwardly depending vertical leg portions the lower ends of which terminate adjacent said guide tracks, respectively;
   (c) a plurality of carrier means connecting the lower ends of said bow leg portions for sliding movement relative to the associated guide track, respectively, said bow members normally having an expanded condition relative to each other in which said bow members are spaced longitudinally of the flat bed vehicle; and
   (d) a sheet-like flexible tarp cover member supported by said bow members to enclose at least a portion of the space above the flat bed vehicle when said bow members are in said expanded condition, said tarp member having a top portion supported by said bow horizontal positions, and a pair of side portions extending downwardly adjacent the external surfaces of said bow leg portions, respectively;
   (e) and further wherein each of said carrier means includes:
      (1) a vertically-arranged longitudinally extending carrier plate mounted in the opening contained in the associated guide track; and
      (2) upper and lower pairs of longitudinally spaced guide wheel connected with said carrier plate for rotation about transverse horizontal axis relative to said flat bed, respectively;
      (3) the wheels of successive carrier means associated with a given guide track being mounted on alternate pairs of said guide rails, respectively, thereby to cause the adjacent ends of the carrier means to overlap when the bow members are in the collapsed second condition, whereby tight packing of the bow members and attendant collapsing of the tarp member are achieved.

* * * * *